United States Patent [19]

Watanabe et al.

[11] Patent Number: 5,695,851
[45] Date of Patent: Dec. 9, 1997

[54] COATING COMPOSITION AND MOLDED ARTICLES HAVING A SURFACE COATED THEREWITH

[75] Inventors: Hiroyuki Watanabe; Hitoshi Ige; Akira Yanagase, all of Otake, Japan

[73] Assignee: Mitsubishi Rayon Co., Ltd., Tokyo, Japan

[21] Appl. No.: 525,653

[22] PCT Filed: Feb. 1, 1995

[86] PCT No.: PCT/JP95/00130

§ 371 Date: Sep. 28, 1995

§ 102(e) Date: Sep. 28, 1995

[87] PCT Pub. No.: WO95/21220

PCT Pub. Date: Aug. 10, 1995

[30] Foreign Application Priority Data

Feb. 2, 1994 [JP] Japan .................... 6-011246

[51] Int. Cl.$^6$ .................... C08K 3/36; B32B 19/02; B32B 27/20; B32B 17/10
[52] U.S. Cl. .................... 428/147; 428/35.7; 428/411.1; 428/412; 428/405; 428/447; 428/451; 428/483; 428/331; 428/429; 428/442; 428/520; 428/522; 522/84; 522/99; 522/83; 522/64; 522/172
[58] Field of Search .................... 522/83, 64, 78, 522/172, 84, 99; 428/35.7, 36.92, 447, 451, 480, 483, 331, 412, 405, 411.1, 429, 442, 522, 520, 147

[56] References Cited

U.S. PATENT DOCUMENTS

| | | | |
|---|---|---|---|
| 4,006,271 | 2/1977 | French | 428/412 |
| 4,173,490 | 11/1979 | Rotenberg | 428/412 |
| 4,482,656 | 11/1984 | Nguyen et al. | 428/447 |
| 4,719,146 | 1/1988 | Hohage et al. | 428/331 |
| 4,822,828 | 4/1989 | Swofford | 522/84 |
| 5,258,225 | 11/1993 | Katsamberis | 428/412 |
| 5,260,350 | 11/1993 | Wright | 428/412 |
| 5,296,295 | 3/1994 | Perkins | 428/412 |
| 5,374,483 | 12/1994 | Wright | 428/412 |
| 5,470,616 | 11/1995 | Uehishi et al. | 428/451 |
| 5,494,645 | 2/1996 | Tayama et al. | 427/508 |

FOREIGN PATENT DOCUMENTS

| | | |
|---|---|---|
| 0 317 858 | 5/1989 | European Pat. Off. . |
| 2089826 | 6/1982 | United Kingdom . |

*Primary Examiner*—Ellis Robinson
*Attorney, Agent, or Firm*—Oblon, Spivak, McClelland, Maier & Neustadt, P.C.

[57] ABSTRACT

A coating composition comprising (a) a crosslinking polymerizable compound (a-1) having at least two (meth) acryloyloxy groups in the molecule, or a mixture of this compound (a-1) and a compound (a-2) copolymerizable therewith, (b) finely divided silica having its surfaces modified by a hydrolyzate of a mixture composed of a silane compound (b-1) capable of forming a bond with component (a), and a silane compound (b-2) incapable of forming a bond with component (a), and (c) a high-energy radiation polymerization initiator. This coating composition can form a cured film having high surface hardness and excellent weather resistance, and can be applied in solventless form.

20 Claims, No Drawings

COATING COMPOSITION AND MOLDED ARTICLES HAVING A SURFACE COATED THEREWITH

TECHNICAL FIELD

This invention relates to coating compositions which, when exposed to high-energy radiation, can form a cured film having excellent abrasion resistance and weather resistance, and to molded articles (in particular, synthetic resin molded articles) having a surface coated with the cured product of such a coating composition.

BACKGROUND ART

In recent years, transparent plastic materials having high fracture resistance are being widely used as substitutes for transparent glass. However, transparent plastic materials have serious disadvantages in that their surfaces are less hard than that of glass, are easily damaged by scratching, and have insufficient abrasion resistance.

Accordingly, many attempts have hitherto been made to improve the abrasion resistance of transparent plastic materials. One of the most common methods is to apply a curable fluid consisting essentially of a compound having a plurality of acryloyloxy or methacryloyloxy groups in the molecule to a surface of a molded article, cure it by the application of heat or by exposure to high-energy radiation such as ultraviolet light, and thereby form a highly mar-resistant coating on the surface of the molded article, as described, for example, in Japanese Patent Laid-Open Nos. 102936/'78, 104638/'78 and 97633/'79.

The curable fluid used in this method is readily available at a relatively low cost. However, since the resulting cured film is an organic material, it is a matter of fact that the abrasion resistance of molded articles having such a coating is more or less limited.

On the other hand, several methods for imparting higher surface hardness to plastic molded articles are known. They include, for example, a method which comprises applying an alkoxysilane compound to a surface of a plastic molded article and curing it by the application of heat to obtain a coated molded article, as described in Japanese Patent Laid-Open Nos. 26822/'73 and 64671/'84; and a method which comprises applying a coating composition composed of colloidal silica and a curable fluid to a surface of a plastic molded article and curing it by the application of heat to obtain a coated molded article, as described in Japanese Patent Laid-Open Nos. 106969/'81 and 272041/'90.

However, the coating compositions used in these methods contain an organic solvent in order to improve their application properties. As a result, the plastic molded article being coated may be cracked in the drying step, the coating film is liable to defects such as unevenness of coating, and the resulting coated molded article tends to present a poor appearance. Moreover, the organic solvent is unavoidably released to the atmosphere in the coating step, and this is undesirable from the viewpoint of global environmental protection on which much attention has been focused in recent years. Furthermore, these coating compositions using a curable fluid are disadvantageous for industrial purposes because their thermal cure requires a large energy consumption and a long curing time.

On the other hand, coating compositions comprising colloidal silica, an alkoxysilane having an acryl or methacryl group, and a polyfunctional acrylate are disclosed in Japanese Patent Publication Nos. 21815/'87, 55307/'89, 2168/'91 and 6190/'91, and Japanese Patent Laid-Open Nos. 204669/'84, 256874/'87, 64138/'90, 18423/'92, 214743/'92, 220411/'92, 98189/'93, 306374/'93, 25363/'94, 41468/'94 and 151694/'94.

These coating compositions can also be used as solventless coating materials and can yield plastic molded articles having fairly high surface hardness. However, they have the disadvantage of being insufficient in weather resistance because the cured film may be hydrolyzed at the interface between the colloidal silica and the alkoxysilane, resulting in cracking or whitening thereof.

In order to solve these problems, the present inventors discovered that a coating composition comprising finely divided silica having its surfaces modified by a hydrolyzate of an alkoxysilane having a styryl group, a polyfunctional acrylate and a high-energy radiation polymerization initiator exhibits good characteristics, and filed an application for a patent as Japanese Patent Application No. 252764/'92. Although this coating composition has more excellent performance than conventional ones, its performance is still less than satisfactory. In the present state of the art, therefore, there has not yet been obtained a coating composition which can also be used in solventless form and can form a cured film having high surface hardness and excellent weather resistance.

DISCLOSURE OF THE INVENTION

It is an object of the present invention to provide a high-energy radiation curable coating composition which can be applied without using any solvent and can form a cured film having high surface hardness, a good appearance and good weather resistance, as well as excellent abrasion resistance and mar resistance.

It is another object of the present invention to provide molded articles having a surface coated with the cured product of such a coating composition.

According to the present invention, there is provided a coating composition comprising (a) a crosslinking polymerizable compound (a-1) having at least two acryloyloxy and/or methacryloyloxy groups in the molecule, or a mixture composed of 50% by weight or more of the crosslinking polymerizable compound (a-1) and 50% by weight or less of a compound (a-2) copolymerizable therewith, (b) finely divided silica having its surfaces modified by a hydrolyzate of a mixture composed of 5 to 95 molar parts of at least one silane compound (b-1) selected from among silane compounds of the general formulas (I) to

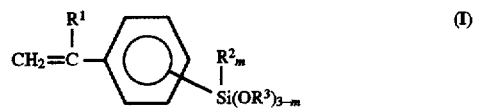

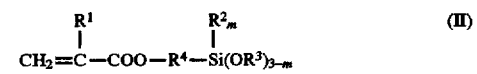

where $R^1$ is a hydrogen atom or a methyl group, $R^2$ is a hydrocarbon radical of 1 to 10 carbon atoms, $R^3$ is a hydrogen atom or a hydrocarbon radical of 1 to 10 carbon atoms, $R^4$ is a divalent hydrocarbon radical of 1 to 10 carbon atoms, $R^5$ and $R^6$ which may be the same or different are each a hydrogen atom or a hydrocarbon radical of 1 to 10 carbon atoms, and m is an integer of 0 to 2, and 95 to 5 molar parts of a silane compound (b-2) of the general formula (V)

where $R^7$ and $R^8$ which may be the same or different are each a hydrocarbon radical of 1 to 10 carbon atoms, $R^9$ is a hydrogen atom or a hydrocarbon radical of 1 to 10 carbon atoms, n and p are each an integer of 0 to 3, and (n+p) has a value of 0 to 3, and (c) a high-energy radiation polymerization initiator.

According to another aspect of the present invention, there is provided a method for preparing the above-described coating composition by mixing the above-described components (a), (b) and (c), which comprises the steps of adding the silane compound (b-2) to a dispersion of finely divided silica so as to modify the surfaces of the finely divided silica by a hydrolyzate of the silane compound (b-2), adding component (a) and distilling off the dispersion medium for finely divided silica and water, and thereafter adding the silane compound (b-1) so as to further modify the surfaces of the finely divided silica by a hydrolyzate of the silane compound (b-1).

Furthermore, molded articles having a surface coated with the cured product of the above-described coating composition are also within the scope of the present invention.

BEST MODE FOR CARRYING OUT THE INVENTION

A cured film formed from a conventionally developed coating composition consisting essentially of finely divided silica modified by a hydrolyzate of the silane compound (b-1) and a polyfunctional acrylate and/or methacrylate [hereinafter abbreviated as (meth)acrylate] is fairly good, but has low weather resistance. In order to overcome this disadvantage, the present inventors made an intensive investigation on the mechanism of surface hardness manifestation in the cured film and on the factors affecting its weather resistance.

As a result, the following facts have been discovered: (1) The weather resistance of the cured film is affected by the degree of surface modification of the finely divided silica, and any inadequate surface modification would lead to a reduction in weather resistance. (2) In order to cause the cured film to exhibit high surface hardness, some form of bond must be formed between the finely divided silica and the cured polymerization product of the polyfunctional (meth)acrylate, and this function is fulfilled by the silane compound (b-1). (3) If there are too many binding sites between the finely divided silica and the cured polymerization product of the polyfunctional (meth)acrylate, this constitutes a factor inhibiting the flexibility of the cured film. Moreover, the cured film cannot conform to the expansion and contraction behavior of the molded article in thermal (high temperature/low temperature) cycle tests and water absorption/drying cycle tests for the evaluation of weather resistance, resulting in the occurrence of cracks and other defects in the cured film.

On the basis of this discovery, the present inventors made a further investigation with a view to developing a coating composition which can form a cured film exhibiting both high surface hardness and good weather resistance, and have now found that the above-described performance can be achieved by using, as the silane compound for modifying the surfaces of finely divided silica, a mixture of a silane compound (b-1) capable of forming a bond between the finely divided silica and the cured polymerization product of the polyfunctional (meth)acrylate, and a silane compound (b-2) incapable of forming a bond therebetween.

In other words, the silane compound (b-1) serves mainly to enhance the surface hardness of the cured film, while the silane compound (b-2) serves for a surface modification of finely divided silica and thereby imparts flexibility to the cured film. Consequently, the use of a coating composition containing finely divided silica modified by both of them can yield a cured film exhibiting high surface hardness and good weather resistance.

The present invention will be described hereinbelow in greater detail.

Component (a) in the coating compositions of the present invention can be a crosslinking polymerizable compound (a-1) having at least two acryloyloxy and/or methacryloyloxy groups [hereinafter abbreviated as (meth)acryloyloxy groups] in the molecule.

The crosslinking polymerizable compounds (a-1) which can be used in the present invention are ones in which the residue constituting a part other than the (meth)acryloyloxy groups is a hydrocarbon or a derivative thereof and which may contain an ether, thioether, ester, amide, urethane or other linkage in the molecule.

Such crosslinking polymerizable compounds (a-1) include, for example, ester compounds derived from a polyhydric alcohol and (meth)acrylic acid or a derivative thereof, and ester compounds derived from a polyhydric alcohol, a polycarboxylic acid, and (meth)acrylic acid or a derivative thereof.

Useful polyhydric alcohols include, for example, dihydric alcohols such as ethylene glycol, diethylene glycol, triethylene glycol, tetraethylene glycol, polyethylene glycols having an average molecular weight of about 300 to about 1,000, propylene glycol, dipropylene glycol, 1,3-propanediol, 1,3-butanediol, 2,3-butanediol, 1,4-butanediol, 1,5-pentanediol, 1,6-hexanediol, 1,9-nonanediol, neopentyl glycol (namely, 2,2-dimethyl-1,3-propanediol), 2-ethylhexyl-1,3-hexanediol, 2,2'-thiodiethanol and 1,4-cyclohexanedimethanol; trihydric alcohols such as trimethylolpropane (namely, 1,1,1-trimethylolpropane), pentaglycerol (namely, 1,1,1-trimethylolethane), glycerol, 1,2,4-butanetriol and 1,2,6-hexanetriol; and other polyhydric alcohols such as pentaerythritol [namely, 2,2-bis (hydroxymethyl)-1,3-propanediol], diglycerol and dipentaerythritol.

Specific examples of crosslinking polymerizable compounds (a-1) obtained as poly(meth)acrylates of polyhydric alcohols include compounds of the general formula (VI)

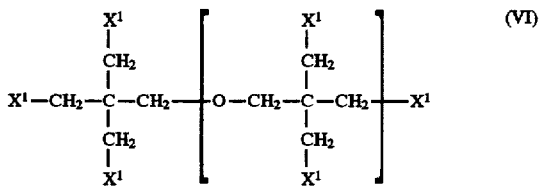

where q is an integer of 0 to 4, and two or more of the four $X^1$ radicals present in the molecule represent (meth)-acryloyloxy groups and the other $X^1$ radicals independently represent hydrogen atoms, hydroxyl groups, amino groups, alkyl groups or substituted alkyl groups.

Specifically, the compounds of the above general formula (VI) include trimethylolpropane tri(meth)acrylate, trimethylolethane tri(meth)acrylate, pentaglycerol tri(meth)acrylate, pentaerythritol tri(meth)acrylate, pentaerythritol tetra(meth) acrylate, dipentaerythritol tri(meth)acrylate, dipentaerythritol tetra(meth)acrylate, dipentaerythritol penta(meth) acrylate, dipentaerythritol hexa(meth)acrylate, tripentaerythritol tetra(meth)acrylate, tripentaerythritol penta(meth)acrylate, tripentaerythritol hexa(meth)acrylate, tripentaerythritol hepta(meth)acrylate and the like.

Besides the compounds of the above general formula (VI), poly(meth)acrylates of polyhydric alcohols include, for example, diethylene glycol (meth)acrylate, triethylene glycol di(meth)acrylate, tetraethylene glycol di(meth)acrylate, 1,4-butanediol di(meth)acrylate, 1,6-hexanediol di(meth)acrylate, 1,9-nonanediol di(meth)acrylate and glycerol tri(meth)acrylate.

Where an ester compound derived from a polyhydric alcohol and (meth)acrylic acid or a derivative thereof is used as the crosslinking polymerizable compound (a-1), especially preferred examples of the ester compound include diethylene glycol di(meth)acrylate, triethylene glycol di(meth)acrylate, tetraethylene glycol di(meth)acrylate, 1,4-butanediol di(meth)acrylate, 1,6-hexanediol di(meth) acrylate, 1,9-nonanediol di(meth)acrylate, trimethylolpropane tri(meth)acrylate, pentaglycerol acrylate and dipentaglycerol pentaacrylate.

In order to obtain ester compounds which are derived from a polyhydric alcohol, a polycarboxylic acid, and (meth) acrylic acid or a derivative thereof and can be used as crosslinking polymerizable compounds (a-1), this can basically be done by reacting a mixture in which the hydroxyl groups of the polyhydric alcohol and the carboxyl groups of both the polycarboxylic acid and the (meth)acrylic acid or derivative thereof are finally present in equivalent amounts.

Among these ester compounds, ones obtained by using a dihydric alcohol, a trihydric alcohol or a mixture of dihydric and trihydric alcohols as the polyhydric alcohol and using a dicarboxylic acid as the polycarboxylic acid are preferred.

Where a mixture of trihydric and dihydric alcohols is used, the molar ratio of the trihydric alcohol to the dihydric alcohol can be chosen arbitrarily.

Where a dicarboxylic acid and (meth)acrylic acid or a derivative thereof are used in combination, it is preferable to use them in such a molar ratio that 2 moles or less of the carboxyl groups of the dicarboxylic acid are present for each mole of the carboxyl group of the (meth)acrylic acid or derivative thereof.

If the dicarboxylic acid is present in excess of the above-described range, the viscosity of the resulting ester is so high that it may be difficult to form a coating film.

The dicarboxylic acids and derivatives thereof which can be used to synthesize the above-described ester compounds include, for example, aliphatic dicarboxylic acids such as succinic acid, adipic acid and sebacic acid; alicyclic dicarboxylic acids such as tetrahydrophthalic acid and 3,6-endomethylenetetrahydrophthalic acid; aromatic dicarboxylic acids such as phthalic acid, isophthalic acid and terephthalic acid; other dicarboxylic acids such as thioglycolic acid, thiodivaleric acid, diglycolic acid, maleic acid, fumaric acid and itaconic acid; and chlorides, anhydrides and esters thereof.

Specific examples of the above-described ester compounds which can be used as crosslinking polymerizable compounds (a-1) include saturated and unsaturated polyester poly(meth)acrylates formed by the combined use of malonic acid/trimethylolethane/(meth)acrylic acid, malonic acid/trimethylolpropane/(meth)acrylic acid, malonic acid/glycerol/(meth)acrylic acid, malonic acid/pentaerythritol/(meth)acrylic acid, succinic acid/trimethylolethane/(meth) acrylic acid, succinic acid/trimethylolpropane/(meth)acrylic acid, succinic acid/glycerol/(meth)acrylic acid, succinic acid/pentaerythritol/(meth)acrylic acid, adipic acid/trimethylolethane/(meth)acrylic acid, adipic acid/trimethylolpropane/(meth)acrylic acid, adipic acid/pentaerythritol/(meth)acrylic acid, adipic acid/glycerol/(meth)acrylic acid, glutaric acid/trimethylolethane/(meth) acrylic acid, glutaric acid/trimethylolpropane/(meth)acrylic acid, glutaric acid/glycerol/(meth)acrylic acid, glutaric acid/pentaerythritol/(meth)acrylic acid, sebacic acid/trimethylolethane/(meth)acrylic acid, sebacic acid/trimethylolpropane/(meth)acrylic acid, sebacic acid/glycerol/(meth)acrylic acid, sebacic acid/pentaerythritol/(meth)acrylic acid, fumaric acid/trimethylolethane/(meth) acrylic acid, fumaric acid/trimethylolpropane/(meth)acrylic acid, fumaric acid/glycerol/(meth)acrylic acid, fumaric acid/pentaerythritol/(meth)acrylic acid, itaconic acid/trimethylolethane/(meth)acrylic acid, itaconic acid/trimethylolpropane/(meth)acrylic acid, itaconic acid/pentaerythritol/(meth)acrylic acid, maleic anhydride/trimethylolethane/(meth)acrylic acid or maleic anhydride/glycerol/(meth)acrylic acid.

In addition, other compounds which can be used as crosslinking polymerizable compounds (a-1) include, for example, urethane (meth)acrylates obtained by reacting a polyisocyanate such as a tolylene triiosocyanate of the general formula (VII)

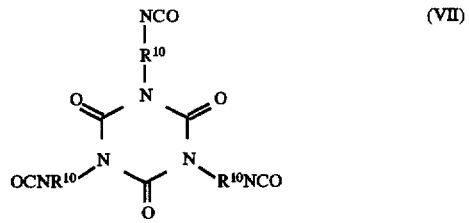

where $R^{10}$ is an alkylene group of 1 to 10 carbon atoms, hexamethylene diisocyanate, tolylene diisocyanate, diphenylethane diisocyanate, xylene diisocyanate, 4,4'-methylenebis(cyclohexyl isocyanate), isophorone diisocyanate or trimethylhexamethylene diisocyanate, with an acrylic monomer having active hydrogen, such 2-hydroxyethyl (meth)acrylate, 2-hydroxy-3-methoxypropyl(meth)acrylate, N-methylol(meth) acrylamide or N-hydroxy(meth)acrylamide, the reaction being carried out in the usual manner by using the reactants in such amounts that 1 mole or more of the acrylic monomer is present for each mole of the isocyanate group; and poly[(meth)acryloyloxyethyl] isocyanurates such as the tri (meth)acrylate of tris(2-hydroxyethyl)isocyanuric acid.

Component (a) in the coating compositions the present invention can also be a mixture composed of 50% or more of the crosslinking polymerizable compound (a-1) and 50% or less of a compound (a-2) copolymerizable therewith.

For example, compounds having one (meth)acryloyloxy group in the molecule can be used as copolymerizable compounds (a-2). Specific examples thereof include methyl (meth)acrylate, ethyl (meth)acrylate, butyl (meth)acrylate, isobutyl (meth)acrylate, t-butyl (meth)acrylate, 2-ethylhexyl (meth)acrylate, lauryl (meth)acrylate, dodecyl (meth) acrylate, cyclohexyl (meth)acrylate, 2-hydroxyethyl (meth) acrylate, 2-hydroxypropyl (meth)acrylate, glycidyl (meth) acrylate, tetrahydrofurfuryl (meth)acrylate, benzyl (meth) acrylate, isobornyl (meth)acrylate, 1-adamantyl (meth) acrylate, 3,5-dimethyl-1-adamantyl (meth)acrylate, dicyclopentanyl (meth)acrylate, dicyclopentenyl (meth) acrylate, 1,4-butylene glycol mono(meth)acrylate, ethoxyethyl (meth)acrylate, ethylcarbitol (meth)acrylate, 2-hydroxy-3-chloropropyl (meth)acrylate, (meth) acrylamide, N-hydroxyethyl(meth)acrylamide, N-hydroxymethyl(meth)acrylamide, N-hydroxypropyl (meth)acrylamide, 2,2,2-trifluoroethyl (meth)acrylate, 2,2,3, 3-tetrafluoropropyl(meth)acrylate, 1H,1H,5H-octafluoropentyl(meth)acrylate, N-hydroxy-butyl(meth) acrylamide, hydroxymethyldiacetone(meth)-acrylamide and N-hydroxyethyl-N-methyl(meth)acrylamide.

Moreover, there can also be used mono(meth)acrylates of the general formulas (VIII) and (IX)

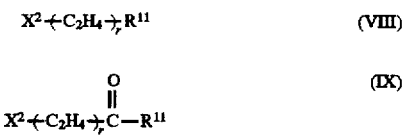

where r is an integer of 1 to 10, $X^2$ is a (meth)acryloyloxy group, and $R^{11}$ is an alkyl group, a substituted alkyl group, a phenyl group, a substituted phenyl group, a benzyl group or a substituted benzyl group.

These mono(meth)acrylates of the general formulas (VIII) and (IX) include, for example, methoxydiethylene glycol (meth)acrylate, methoxypolyethylene glycol (meth) acrylate, phenoxypolyethylene glycol (meth)acrylate and butoxyethylene glycol (meth)acrylate.

Furthermore, other compounds which can be used as copolymerizable compounds (a-2) include, for example, β-(meth)acryloyloxyethyl hydrogen phthalate, β-(meth)-acryloyloxyethyl hydrogen succinate, β-(meth)-acryloyloxypropyl hydrogen succinate, and various well-known epoxy (meth)acrylates and urethane (meth)acrylates.

The compound (a-2) may be chosen according to the intended use of the cured film obtained in the present invention. Where a film having high surface hardness is desired, it is preferable to use a compound (a-2) which can give a polymer having a high glass transition temperature. Specific examples thereof include t-butyl (meth)acrylate, cyclohexyl (meth)acrylate, isobornyl (meth)acrylate, 1-adamantyl (meth)acrylate, 3,5-dimethyl-1-adamantyl (meth)acrylate, dicyclopentanyl (meth)acrylate and dicyclopentenyl (meth)acrylate.

Where a compound (a-2) as described above is used, its content in component (a) should be not greater than 50% by weight and preferably not greater than 30% by weight. If the content of the compound (a-2) in component (a) is outside the above-described range, the cured film obtained in the present invention shows a reduction in surface hardness.

Component (b) in the coating compositions of the present invention is finely divided silica having its surfaces modified by a hydrolyzate of a mixture composed of at least one silane compound (b-1) selected from among compounds of the general formulas (I) to (IV), and at least one silane compound (b-2) selected from among compounds of the general formula (V).

The expression "having its surfaces modified by a hydrolyzate" as used herein means that a hydrolyzate of the silane compounds are held on all or part of the surfaces of the finely divided silica and, therefore, its surface properties are improved. It is to be understood that a product formed by condensation of the hydrolyzate of the silane compound may also be held on the surfaces of the finely divided silica.

Typically, this surface modification in the present invention can be easily effected by subjecting the silane compounds to hydrolysis, or both hydrolysis and condensation, in the presence of finely divided silica.

Although no particular limitation is placed on the size of the finely divided silica, its average particle diameter may range from 1 nm to 1 μm and preferably from 5 to 200 nm. Where the film formed from a coating composition containing finely divided silica needs to have transparency, it is preferable to use finely divided silica having an average particle diameter of 5 to 100 nm.

For example, colloidal silica can be used as the finely divided silica.

Where colloidal silica is used, no particular limitation is placed on the dispersion medium therefor. However, there can usually be used water; alcohols such as methanol, ethanol, isopropyl alcohol and n-butanol; cellosolves; dimethylacetamide, toluene and xylene; and the like. Especially preferred dispersion media are alcohols, cellosolves, toluene and water.

Silane compounds (b-1) of the general formulas (I) to (IV), which can be used in the present invention, serve to form a bond between finely divided silica and component (a) upon exposure to high-energy radiation, and thereby enable the finely divided silica to impart surface hardness to the cured film.

Silane compounds (b-1) of the general formula (I) include, for example, p-vinylphenyltrimethoxysilane (namely, p-trimethoxysilylstyrene), p-vinylphenyltriethoxysilane, p-vinylphenyltriisopropoxysilane, p-vinylphenylmethyldimethoxysilane, p-vinylphenylmethyldiethoxysilane, p-vinylphenylethyldimethoxysilane, p-vinylphenylpropyldimethoxysilane, p-vinylphenylphenyldimethoxysilane, p-vinylphenyldimethylmethoxysilane, o-vinylphenyltrimethoxy-silane, o-vinylphenylmethyldimethoxysilane, m-vinylphenyltrimethoxysilane, p-isopropenylphenyltrimethoxysilane, p-isopropenylphenylmethyldimethoxysilane, m-isopropenylphenyltrimethoxysilane and m-isopropenylphenylmethyldimethoxysilane.

Silane compounds (b-1) of the general formula (II) include, for example, γ-acryloyloxypropyltrimethoxysilane, γ-acryloyloxypropyltriethoxysilane, γ-acryloyloxypropylmethyldimethoxysilane, γ-acryloyloxypropylmethyldiethoxy-silane, γ-acryloyloxypropylethyldimethoxysilane, β-acryloyloxyethyltrimethoxysilane, β-acryloyloxyethylmethyldimethoxysilane, γ-methacryloyloxypropyltrimethoxy-silane, γ-methacryloyloxypropyltriethoxysilane, γ-methacryloyloxypropylmethyldimethoxysilane, γ-methacryloyloxypropylmethyldiethoxysilane, γ-methacryloyloxypropylethyldimethoxysilane, γ-methacryloyloxypropyldimethylmethoxysilane, β-methacryloyloxyethyltrimethoxysilane and β-methacryloyloxyethylmethyldimethoxysilane.

Silane compounds (b-1) of the general formula include, for example, vinyltrimethoxysilane, vinyltriethoxysilane, vinyltri-n-butoxysilane, vinylmethyldimethoxysilane, vinylmethyldiethoxysilane, vinylethyldimethoxysilane, vinyldimethylmethoxysilane, isopropenyltrimethoxysilane and isopropenylmethyldimethoxysilane.

Silane compounds (b-1) of the general formula (IV) include, for example, γ-aminopropyltrimethoxysilane, γ-aminopropyltriethoxysilane, γ-aminopropylmethyldimethoxy-silane, γ-aminopropylmethyldiethoxysilane, γ-aminopropylethyldimethoxysilane, γ-aminopropyldimethylmethoxysilane, N-methyl-γ-aminopropyltrimethoxysilane, N-ethyl-γ-aminopropyltrimethoxysilane, N-phenyl-γ-aminopropyltrimethoxysilane, N-phenyl-γ-aminopropyltriethoxysilane, N-phenyl-γ-aminopropylmethyldimethoxysilane, N-phenyl-γ-aminopropylmethyldiethoxysilane, N,N-dimethyl-γ-aminopropyltrimethoxysilane and N,N-diethyl-γ-aminopropyltrimethoxysilane.

If only a silane compound of the general formula (IV) (for example, γ-aminopropyltrimethoxysilane or γ-aminopropyltriethoxysilane) is used to effect a surface modification of finely divided silica and thereby prepare a (solventless) coating composition in accordance with the present invention, the system undergoes gelation and the resulting coating composition is useless. However, a useful coating composition can be prepared, without causing gelation, by using such a silane compound in combination with a silane compound (b-2) which will be described below. These silane compounds (b-1) of the general formulas (I) to (IV) may be used alone or in admixture of two or more.

Silane compounds (b-2) of the general formula (V) contribute to the surface modification of finely divided silica, but do not have the ability to form a bond between the finely divided silica and the cured polymerization product of component (a). Thus, they serves as components for improving the flexibility of the cured film and thereby imparting good weather resistance thereto.

Specific examples of silane compounds (b-2) of the general formula (V) include tetramethoxysilane, tetraethoxyesilane, tetra-n-butoxysilane, methyltrimethoxysilane, methyltriethoxysilane, ethyltrimethoxysilane, phenyltrimethoxysilane, phenyltriethoxysilane, dimethyldimethoxysilane, diphenyldimethoxysilane, methylethyldimethoxysilane, methylphenyldimethoxysilane, trimethylmethoxysilane, trimethylethoxysilane, triethylmethoxysilane and mixtures thereof.

In the present invention, the silane compound (b-1) and the silane compound (b-2) are used in a molar ratio ranging from 5:95 to 95:5, preferably from 10:90 to 90:10, and more preferably from 10:90 to 60:40.

If finely divided silica is modified by using the silane compound (b-1) and the silane compound (b-2) in a molar ratio outside the above-described range, molded articles having a surface coated with a coating composition containing such finely divided silica show a reduction in surface hardness and weather resistance.

Where colloidal silica is used as the finely divided silica, the silane compounds may be mixed with the dispersion medium for colloidal silica and hydrolyzed with the aid of water present in this system or newly added water. Thus, there is obtained finely divided silica (b) having its surfaces modified by the resulting hydrolyzate.

In carrying out the hydrolysis reaction of the above-described silane compounds, an inorganic or organic acid may be used as a catalyst. Useful inorganic acids include, for example, hydrohalogenic acids (such as hydrochloric acid, hydrofluoric acid and hydrobromic acid), sulfuric acid, nitric acid and phosphoric acid. Useful organic acids include, for example, formic acid, acetic acid, oxalic acid, acrylic acid and methacrylic acid.

Moreover, a solvent may be used to carry out the reaction mildly and uniformly. To this end, it is preferable to use a solvent which can dissolve the reactants (i.e., silane alkoxides) together with water and the catalyst. Specific examples of the solvent include water; alcohols such as methanol, ethanol and isopropyl alcohol; ketones such as acetone and methyl isobutyl ketone; and ethers such as tetrahydrofuran and dioxane.

For this purpose, the above-described dispersion medium for colloidal silica may be used as the solvent, or a necessary amount of a solvent may be added anew. In the latter case, any of the above-described solvents may be used.

No particular limitation is placed on the amount of solvent used, provided that the reactants can be dissolved homogeneously. However, if the concentrations of the reactants are too low, the reaction rate may become unduly slow.

The hydrolysis and condensation reactions of the silane compounds may be carried out at a temperature ranging from room temperature to about 120° C. for a period ranging from about 30 minutes to about 24 hours, and preferably at a temperature ranging from room temperature to about the boiling point of the solvent for a period ranging from about 1 to 10 hours.

No particular limitation is placed on the ratio between the finely divided silica and the silane compounds used in component (b). However, the mixture of the silane compound (b-1) and the silane compound (b-2) is preferably used in an amount of 5 to 200 parts by weight, more preferably 10 to 100 parts by weight, per 100 parts by weight of the finely divided silica (or the solid content in the case of colloidal silica).

Similarly, no particular limitation is placed on the ratio between components (a) and (b). However, component (b) is preferably used in an amount of 1 to 200 parts by weight, more preferably 5 to 60 parts by weight, per 100 parts by weight of component (a).

The high-energy radiation which can be used to cure the coating compositions of the present invention include, for example, ionizing radiation such as β-rays, γ-rays, X-rays and accelerated electron rays; and ultraviolet light. In order that polymerization reactions may take place in the coating compositions of the present invention, it is necessary to add a high-energy radiation polymerization initiator (c) thereto.

Specific examples of component (c) include carbonyl compounds such as benzoin, benzoin methyl ether, benzoin ethyl ether, benzoin isopropyl ether, benzoin isobutyl ether, acetoin, butyroin, toluoin, benzil, benzophenone, p-methoxybenzophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)phenyl (2-hydroxy- 2-methylpropyl) ketone, 1-hydroxycyclohexyl phenyl ketone, 2-methyl-1-[4-(methylthio)phenyl]-2-morpholinopropanone-1, benzyl dimethyl ketal, thioxanthone, 2-chlorothioxanthone, 2,4-dichlorothioxanthone, 2-methylthioxanthone, 2,4-dimethylthioxanthone, 2-isopropylthioxanthone, 2,4-diethylthioxanthone, 2,4-diisopropylthioxanthone and methyl phenyl glyoxylate; sulfur compounds such as tetramethylthiuram monosulfide and tetramethylthiuram disulfide; azo compounds such as azobisisobutyronitrile and azobis-2,4-dimethylvaleronitrile; peroxide compounds such as benzoyl peroxide and di-tert-butyl peroxide; and phosphine oxide compounds such as 2,4,6-trimethylbenzoyldiphenylphosphine oxide, benzoyldiethoxyphosphine oxide and bis(2,6-dimethoxy-benzoyl)-2,4,4-trimethylpentylphosphine oxide. Among others, 2,4,6-trimethylbenzoyldiphenylphosphine oxide, bis(2,6-dimethoxybenzoyl)-2,4,4-trimethylpentylphosphine oxide and methyl phenyl glyoxylate are preferred.

These high-energy radiation polymerization initiators may be used alone or in admixture of two or more. The high-energy radiation polymerization initiator (c) is preferably used in an amount of 0.01 to 10 parts by weight per 100 parts by weight of component (a).

Basically, the coating compositions of the present invention are provided in solventless form. If desired, however, they can be used by adding an organic solvent thereto.

For this purpose, there may be used any organic solvent that is uniformly miscible with components (a) and (c) and permits component (b) to be uniformly dispersed therein. Among others, organic solvents having a boiling point of 50° to 200° C. at atmospheric pressure and a viscosity of 10 centipoises or less at ordinary temperature (25° C.) are suitable. If the boiling point of the organic solvent used is outside the above-described range, the resulting coating solution is disadvantageous in that it may be evaporated to dryness or cannot be dried after application. If the viscosity is outside the above-described range, the resulting coating solution tends to show a reduction in application properties.

Useful organic solvents include, for example, alcohols such as ethanol, isopropyl alcohol, n-propyl alcohol, n-butyl alcohol and isobutyl alcohol; aromatic hydrocarbons such as benzene and toluene; ketones such as acetone and methyl ethyl ketone; ethers such as dioxane; esters such as ethyl acetate and butyl acetate; and N,N-dimethylformamide and its analogs. These organic solvents may be used alone or in admixture of two or more.

Moreover, the coating compositions of the present invention can preferably contain an ultraviolet absorber (d) in order to prevent deterioration of the cured film and protect the substrate.

Useful ultraviolet absorbers (d) include ones derived from benzophenone, benzotriazole, oxalic anilide, cyanoacrylate and triazine. However, ultraviolet absorbers derived from benzotriazole are preferably used in the coating compositions of the present invention.

Specific examples thereof include 2-(2'-hydroxy-5'-methylphenyl)benzotriazole, 2-(2'-hydroxy-5'-t-butylphenyl)benzotriazole, 2-(2'-hydroxy-5'-t-octylphenyl)benzotriazole, 2-[2'-hydroxy-3',5'-bis(α,α-dimethylbenzyl)phenyl]-2H-benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)- 5-chlorobenzotriazole, 2-(2'-hydroxy-3', 5'-di-t-amylphenyl)benzotriazole, 2-(2'-hydroxy-3'-t-butyl-5'-octoxycarbonyl-ethylphenyl)benzotriazole and 2-(2'-hydroxy-3'-t-butyl-5'-polyethyleneglycoxycarbonylethylphenyl)benzotriazole. These ultraviolet absorbers (d) may be used alone or in admixture of two or more.

Furthermore, the coating compositions of the present invention can also contain a light stabilizer (e). Among others, a hindered amine type light stabilizer is preferably used.

Specific examples thereof include bis(2,2,6,6-tetramethyl-4-piperidyl) sebacate, bis(1,2,2,6,6-pentamethyl-4-piperidyl) sebacate, 4-benzoyloxy-2,2,6,6-tetramethylpiperidine, bis(1-octoxy-2,2,6,6-tetramethyl-4-piperidyl) sebacate, 1-[2-{3-(3,5-di-t-butyl-4-hydroxyphenyl)propionyloxy}ethyl]-4-{3-(3,5-di-t-butyl-4-hydroxyphenyl)propionyloxy}-2,2,6,6-tetramethylpiperidine, 8-acetyl-3-dodecyl-7,7,9,9-tetramethyl-1,3,8-triazaspiro-[4.5]decane-2,4-dione, 4-(meth)acryloyloxy-2,2,6,6-tetramethylpiperidine and 4-(meth)acryloyloxy-1,2,2,6,6-pentamethylpiperidine. Among these compounds, bis(2,2,6,6-tetramethyl-4-piperidyl) sebacate, bis(1,2,2,6,6- pentamethyl-4-piperidyl) sebacate, 4-benzoyloxy-2,2,6,6-tetramethylpiperidine and bis(1-octoxy-2,2,6,6-tetramethyl- 4-piperidyl) sebacate are most preferably used.

Care must be taken in using these light stabilizers (e) because, as is generally known, some light stabilizers form a precipitate in the coating composition or cause gelation of the system, making it impossible to apply the coating composition. This can be avoided by properly choosing the types of components (a), (b-1) and (b-2) and/or adding a suitable solvent.

More specifically, when any of the above-described silane compounds of the general formulas (I) to (III) is used as component (b-1) in solventless coating compositions in accordance with the present invention, the use of a hindered amine type light stabilizer of the general formula (X)

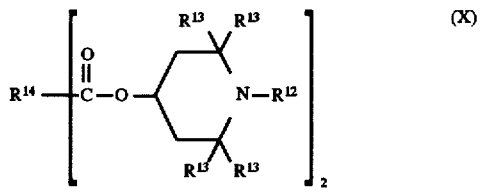

where $R^{12}$ is a hydrogen atom or a hydrocarbon radical of 1 to 12 carbon atoms, $R^{13}$ is a hydrocarbon radical of 1 to 4 carbon atoms, and $R^{14}$ is a divalent hydrocarbon radical of 4 to 12 carbon atoms, such as bis(2,2,6,6-tetramethyl-4-piperidyl) sebacate or bis(1,2,2,6,6-pentamethyl-4-piperidyl) sebacate, causes gelation of the coating composition. Accordingly, it is preferable to use a hindered amine type light stabilizer of the general formula (XI) or (XII)

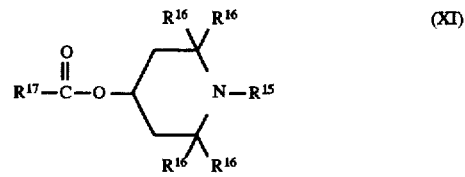

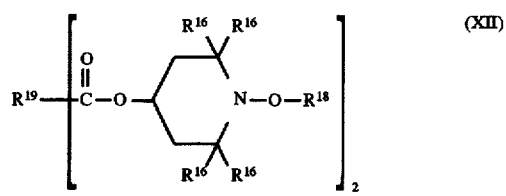

where $R^{15}$ is a hydrogen atom or a hydrocarbon radical of 1 to 12 carbon atoms, $R^{16}$ is a hydrocarbon radical of 1 to 4 carbon atoms, $R^{17}$ is a hydrocarbon radical of 1 to 12 carbon atoms which may contain a carbon-to-carbon double bond, $R^{18}$ is a hydrocarbon radical of 1 to 12 carbon atoms, and $R^{19}$ is a divalent hydrocarbon radical of 4 to carbon atoms, such as 4-benzoyloxy-2,2,6,6-tetramethylpiperidine or bis (1-octoxy-2,2,6,6-tetramethyl-4-piperidyl) sebacate.

However, when a silane compound of the general formula (IV) is used as component (b-1) in solventless coating compositions in accordance with the present invention, any of the above-described hindered amine type light stabilizers may be used without causing gelation of the system. Moreover, it has been revealed that these hindered amine type light stabilizers can improve the weather resistance of the cured films formed from the coating compositions of the present invention.

If necessary, the coating compositions of the present invention can suitably contain various additives such as leveling agents, surface-active agents and storage stabilizers.

Although no particular limitation is placed on the method for preparing the coating compositions of the present invention, it is especially preferable to employ the following exemplary procedure. First of all, a dispersion of colloidal silica is mixed with component (b) comprising silane compounds and, if necessary, with water and a catalyst. This mixture is reacted under the above- described reaction conditions and the resulting fluid is mixed with component (a).

Then, the dispersion medium for colloidal silica and the volatile matter produced as a result of the hydrolysis reaction of the silane compounds are removed. Thereafter, component (c) and, if necessary, other additives are added.

Especially where a silane compound of the general formula (IV) is used as the silane compound (b-1), it is preferable to mix component (a) with component (b) according to the following procedure. First of all, a silane compound (b-2) of the general formula (V) is added to a dispersion of finely divided silica. Thus, the silane compound (b-2) is hydrolyzed to effect a surface modification of the finely divided silica by means of the resulting hydrolyzate and thereby alter its surface condition. Then, component (a) is added to this reaction system and most of the volatile matter (e.g., the dispersion medium for finely divided silica and water) is distilled off so as to replace the dispersion medium for finely divided silica by component (a). Thereafter, a silane compound (b-1) of the general formula (IV) is added and hydrolyzed to effect a further surface modification of the finely divided silica by means of the resulting hydrolyzate. If a silane compound (b-1) of the general formula (IV) is added to a dispersion of finely divided silica in a volatile dispersion medium such as an alcohol, the silica tends to separate out and form a gel. That is, by employing the above-described two-stage surface modification method, the coating compositions of the present invention using a silane compound of the general formula (IV) can be prepared without causing any gelation.

The techniques for applying the coating compositions of the present invention to surfaces of various molded articles include brushing, casting, roller coating, bar coating, spray coating, air-knife coating, dipping and the like.

The coating compositions of the present invention are suitably applied to molded article surfaces in such an amount as to give a cured film having a thickness of 1 to 30 μm. If the thickness is less than 1 μm, the cured film has low abrasion resistance, while if the thickness is greater than 30 μm, the cured film undesirably tends to be cracked.

The molded articles to which the coating compositions of the present invention can be applied include a variety of well-known molded articles for which an improvement in abrasion resistance and other surface properties is desired.

Generally, they include synthetic resin molded articles formed, for example, of polymethyl methacrylate, copolymers having methyl methacrylate as a principal component, polystyrene, styrene-methyl methacrylate copolymer, styrene-acrylonitrile copolymer, polycarbonate, cellulose acetate butyrate resin, polyacryl diglycol carbonate resin, polyvinyl chloride resin and polyester resins.

Moreover, since the cured films formed from the coating compositions of the present invention have very excellent weather resistance, they are very useful for outdoor applications including, for example, windowpanes, windshields, roofing panels and headlamp covers for transport means such as vehicles and aircraft; windowpanes and roofing materials for buildings; soundproof barriers for roads; and various face plates such as nameplates and face plates for display use.

The present invention is further illustrated by the following examples. However, these examples are not to be construed to limit the scope of the invention. In these examples, all parts are by weight.

The measurement and evaluation of various properties in the examples were performed according to the following procedures.
1) Mar resistance A piece of #000 steel wool was attached to a circular pad having a diameter of 25 mm, placed on the surface of a sample held on the table of a reciprocating abrasion tester, and moved back and forth for 100 cycles under a load of 1,000 g. Thereafter, the abraded sample was washed and its haze was measured with a hazemeter.

The mar resistance to steel wool (%) was expressed by [(haze after abrasion)−(haze before abrasion)].
2) Abrasion resistance According to the Taber abrasion test method, a sample was tested by using a CS-10F truck wheel in combination with a 500 g weight. After the truck wheel was turned for 100 cycles, the haze of the sample was measured with a hazemeter.

Haze measurements were made at four locations on the track of the abrasion cycles and the average thereof was calculated. The Taber abrasion assistance (%) was expressed by [(haze after Taber testing)−(haze before Taber testing)].
3) Adhesion of the cured film By cutting the cured film of a sample with a razor at intervals of 1 mm, 11 parallel cuts were made in each of two orthogonal directions to form a total of 100 squares in the cured film. A strip of cellophane adhesive tape was applied thereto under pressure and peeled off upward and quickly at a peel angle of 90°. The number (X) of the unremoved squares was counted and the adhesion of the cured film was expressed by X/100.
4) Appearance The appearance of a molded article having a cured film formed thereon was visually examined for defects such as discoloration, graininess, cracking and cloudiness, and rated according to the following basis:

○. . . No noticeable defects were observed.

X . . . Yellow discoloration characterized by a ΔYI value of not less than 4.0 or the occurrence of cracking or cloudiness was observed.
5) Weather resistance Using a sunshine weatherometer (Model WEL-SUN-DC; manufactured by Suga Test Instruments Co., Ltd.) having a black panel temperature of 63° C., a molded article having a cured film formed thereon was subjected to a 1,000-hour or 2,000-hour weathering test in which the molded article was cyclically exposed to water spray for 12 minutes and dried for 48 minutes. Thereafter, the appearance and adhesion of the cured film was evaluated.

○. . . No noticeable defects were observed.

Δ. . . A reduction in adhesion was observed.

X . . . Yellow discoloration characterized by a ΔYI value of not less than 4.0 or the occurrence of cracking or cloudiness was observed.

[EXAMPLE 1]

(Preparation of a coating composition)

2.0 parts of p-vinylphenyltrimethoxysilane (hereinafter abbreviated as VPTMS), 1.7 parts of phenyltrimethoxysilane (hereinafter abbreviated as PTMS) and 1 part of a 0.01N aqueous solution of hydrochloric acid were added to 35 parts of a dispersion of colloidal silica in isopropyl alcohol (with a silica content of 30% by weight; manufactured and sold by Nissan Chemical Industries, Ltd. under the trade name of IPA-ST). This mixture was stirred at 40° C. for an hour. Thereafter, 30 parts of 1,6-hexanediol diacrylate (hereinafter abbreviated as C6DA) and 20 parts of a condensate of trimethylolethane/acrylic acid/succinic acid (in a molar ratio of 2/4/1) (hereinafter abbreviated as TAS) were added thereto, and all volatile matter was distilled off under reduced pressure.

Then, 1.8 parts of 2,4,6-trimethylbenzoyldiphenylphosphine oxide (hereinafter abbreviated as APO) as a high-energy radiation polymerization initiator and 3.8 parts of 2-(2-hydroxy-5-t-butylphenyl)benzotriazole (manufactured and sold by Ciba-Geigy Ltd. under the trade name of Tinuvin PS; hereinafter abbreviated as UA-1) as an ultraviolet absorber were added thereto and dissolved therein to obtain a coating composition. (Fabrication of a surface-coated molded article)

The coating composition thus obtained was applied to a polycarbonate plate (2 mm thick; manufactured and sold by Mitsubishi Rayon Co., Ltd. under the trade name of Dialite) which had been heated to 50° C. in a Geer oven. Then, a polyester film (50 μm thick; manufactured by Daiya Foil Co., Ltd.) was put on the coated surface, pressed tightly with a sponge roll, and squeezed well so as to give a coating layer having a thickness of about 8 μm.

After the coated plate was allowed to stand for 50 seconds, its polyester film-covered side was irradiated with a 120 W/cm metal halide lamp (an ozoneless type lamp adjusted to an irradiation width of 13 cm, fitted with a parallel-beam reflector, and located at a distance of 30 cm from the object to be irradiated) by passing the coated plate under the lamp at a speed of 2 m/min.

Then, only the polyester film was removed and the coated plate was further passed under a 120 W/cm high-pressure mercury vapor lamp (an ozone type lamp having an irradiation width of 13 cm, fitted with a parallel-beam reflector, and located at a distance of 30 cm from the object to be irradiated) at a speed of 1 m/min. Thus, there was obtained a resin plate having a surface protected by the cured film formed from the coating composition.

The resin plate thus obtained was evaluated according to the previously described procedures, and the results of evaluation are shown in Table 2.

[EXAMPLES 2-22 AND COMPARATIVE EXAMPLES 1-6]

Various coating compositions composed of the ingredients shown in Table 1 were prepared in the same manner as in Example 1. Then, each of these coating compositions was applied to a polycarbonate plate (2 mm thick; manufactured and sold by Mitsubishi Rayon Co., Ltd. under the trade name of Dialite) or a polymethyl methacrylate plate (2 mm thick; manufactured by Mitsubishi Rayon Co., Ltd.) and cured in the same manner as in Example 1. Thus, there was obtained a resin plate having a surface protected by the cured film so formed.

Each of the resin plates thus obtained was evaluated in the same manner as in Example 1, and the results of evaluation are shown in Table 2.

[COMPARATIVE EXAMPLE 7]

(Preparation of a coating composition)

When 3.4 parts of γ-aminopropyltrimethoxysilane (hereinafter abbreviated as APTMS) was added to 35 parts of the same colloidal silica dispersion as used in Example 1, the colloidal silica underwent gelation and separated out. Consequently, this mixture was useless as a coating composition.

Further addition of 30 parts of C6DA and 20 parts of TAS to the gelation product caused no change thereof.

On the other hand, 30 parts of C6DA and 20 parts of TAS were added to 35 parts of the same colloidal silica dispersion and, thereafter, 3.4 parts of APTMS was added thereto. Also in this case, the colloidal silica underwent gelation and this mixture was useless as a coating composition.

[EXAMPLE 23]

(Preparation of a coating composition)

1.7 parts of PTMS and 0.8 part of deionized water were added to 35 parts of the same colloidal silica dispersion as used in Example 1. This mixture was stirred at 40° C. for an hour.

Thereafter, 30 parts of C6DA and 20 parts of TAS were added thereto, and almost all volatile matter was distilled off under reduced pressure.

Then, 1.7 parts of APTMS was added thereto. This mixture was stirred at 40° C. for an hour, so that the residual volatile matter was completely distilled off. Thereafter, a coating composition was completed by further addition of 1.8 parts of APO and 3.8 parts of UA-1.

(Fabrication of a surface-coated molded article)

The coating composition thus obtained was applied to a polycarbonate plate placed under the same conditions as in Example 1. Then, a polyester film (50 μm thick; manufactured by Daiya Foil Co., Ltd.) was put on the coated surface, pressed tightly with a sponge roll, and squeezed well so as to give a coating layer having a thickness of about 8 μm.

After the coated plate was allowed to stand for 120 seconds, its polyester film-covered side was irradiated with a 80 W/cm metal halide lamp (an ozoneless type lamp adjusted to an irradiation width of 13 cm, fitted with a parallel-beam reflector, and located at a distance of 30 cm from the object to be irradiated) by passing the coated plate under the lamp at a speed of 0.5 m/min.

Then, only the polyester film was removed and the coated plate was further passed under a 120 W/cm high-pressure mercury vapor lamp (an ozone type lamp having an irradiation width of 13 cm, fitted with a parallel-beam reflector, and located at a distance of 30 cm from the object to be irradiated) at a speed of 1 m/min. Thus, there was obtained a resin plate having a surface protected by the cured film formed from the coating composition.

The resin plate thus obtained was evaluated according to the previously described procedures, and the results of evaluation are shown in Table 2.

[EXAMPLES 24 and 25]

Two coating compositions composed of the ingredients shown in Table 1 were prepared in the same manner as in Example 23. Then, each of these coating compositions was applied to a polycarbonate plate (2 mm thick; manufactured and sold by Mitsubishi Rayon Co., Ltd. under the trade name of Dialite) and cured in the same manner as in Example 23. Thus, there was obtained a resin plate having a surface protected by the cured film so formed.

Each of the resin plates thus obtained was evaluated in the same manner as in Example 1, and the results of evaluation are shown in Table 2.

[EXAMPLE 26]

(Preparation of a coating composition)

1.7 parts of PTMS, 1 part of VPTMS and 0.8 part of deionized water were added to 35 parts of the same colloidal silica dispersion as used in Example 1. This mixture was stirred at 40° C. for an hour. Thereafter, 30 parts of C6DA and 20 parts of TAS were added thereto, and almost all volatile matter was distilled off under reduced pressure.

Then, 0.8 part of APTMS was added thereto. This mixture was stirred at 40° C. for an hour, so that the residual volatile matter was completely distilled off. Thereafter, a coating composition was completed by further addition of 1.8 parts of APO and 3.8 parts of UA-1.

(Fabrication of a surface-coated molded article)

The coating composition thus obtained was applied to a polycarbonate plate (placed under the same conditions as in Example 1) and cured in the same manner as in Example 23. Thus, there was obtained a resin plate having a surface protected by the cured film so formed.

The resin plate thus obtained was evaluated in the same manner as in Example 1, and the results of evaluation are shown in Table 2.

[EXAMPLE 27]

6.2 parts of y-methacryloyloxypropylmethoxysilane (hereinafter abbreviated as MPTMS), 10 parts of PTMS and 4 parts of a 0.01N aqueous solution of hydrochloric acid were added to 100 parts of the same colloidal silica dispersion as used in Example 1. This mixture was stirred at 40° C. for 2 hours.

Thereafter, 20 parts of C6DA, 80 parts of bis(-acryloyloxyethyl) hydroxyethyl isocyanurate (manufactured and sold by Toagosei Chemical Industry Co., Ltd. under the trade name of Aronix M-215), 1.2 parts of APO, 0.8 part of methyl phenyl glyoxylate, 10 parts of UA-1, 0.4 part of bis(2,2,6,6-tetramethyl-4-piperidyl) sebacate (manufactured and sold by Sankyo Co., Ltd. under the trade name of Sanol LS 770), 270 parts of isobutyl alcohol, 130 parts of n-butyl acetate and 40 parts of 3-methoxy-1-butanol were added thereto. This mixture was vigorously stirred to obtain a coating composition.

(Fabrication of a surface-coated molded article)

Using the coating composition thus obtained, a polycarbonate plate placed under the same conditions as in Example 1 was dip-coated therewith at a speed of 0.3 cm/sec to form a coating film. The coated plate was allowed to stand at 80° C. for 10 minutes, so that the solvent in the coating composition was evaporated.

Then, the coated plate was exposed to high-energy radiation without covering it with a polyester film. Specifically, using the same high-pressure mercury vapor lamp as used in Example 1, the coated plate was irradiated in the same manner as in Example 1, except that the distance between the coated plate and the lamp was 15 cm and the line speed was 1.5 m/min. Thus, the coating composition was cured to obtain a resin plate having a surface protected by the cured film so formed.

The resin plate thus obtained was evaluated in the same manner as in Example 1, and the results of evaluation are shown in Table 2.

TABLE 1

| | Polyfunctional acrylate | | Colloidal silica dispersion | | Silane compound | | Polymerization initiator | | Ultraviolet absorber & light stabilizer | |
|---|---|---|---|---|---|---|---|---|---|---|
| Example 1 | C6DA | 30 parts | S-1 35 parts | VPTMS | 2.0 parts | APO | 1.8 parts | UA-1 | 3.8 parts |
| | TAS | 20 parts | (silica 10.5 parts) | PTMS | 1.7 parts | | | | |
| 2 | C9DA | 30 parts | S-1 35 parts | VPTMS | 2.0 parts | APO | 1.8 parts | UA-1 | 3.8 parts |
| | FA731A | 20 parts | (silica 10.5 parts) | PTMS | 1.7 parts | | | | |
| 3 | C6DA | 30 parts | S-1 20 parts | MPTMS | 1.2 parts | APO | 1.6 parts | UA-2 | 3.5 parts |
| | FA731A | 10 parts | (silica 6 parts) | PTMS | 1.0 parts | | | | |
| | DPHA | 10 parts | | | | | | | |
| 4 | C6DA | 30 parts | S-1 50 parts | MPTMS | 3.1 parts | APO | 2.0 parts | UA-1 | 4.2 parts |
| | FA731A | 20 parts | (silica 15 parts) | PTMS | 2.5 parts | | | | |
| 5 | C6DA | 25 parts | S-1 50 parts | MPTMS | 3.1 parts | APO | 2.0 parts | UA-1 | 4.2 parts |
| | TAS | 25 parts | (silica 15 parts) | PTMS | 2.5 parts | | | HALS-1 | 0.7 part |
| 6 | C6DA | 25 parts | S-1 50 parts | MPTMS | 3.1 parts | BAPO | 2.0 parts | UA-1 | 4.2 parts |
| | TAS | 25 parts | (silica 15 parts) | PTMS | 2.5 parts | | | HALS-1 | 0.7 part |
| 7 | C6DA | 20 parts | S-1 50 parts | MPTMS | 3.1 parts | APO | 2.0 parts | UA-1 | 4.2 parts |
| | TAS | 30 parts | (silica 15 parts) | PTMS | 2.5 | | | HALS-2 | 0.7 part |
| 8 | C6DA | 20 parts | S-1 50 parts | MPTMS | 3.1 parts | APO | 2.0 parts | UA-1 | 4.2 parts |
| | TAS | 20 parts | (silica 15 parts) | PTMS | 2.5 parts | | | HALS-2 | 0.7 part |
| | R-684 | 10 parts | | | | | | | |
| 9 | C6DA | 20 parts | S-1 50 parts | VPTMS | 2.8 parts | APO | 2.0 parts | UA-1 | 4.2 parts |
| | TAS | 20 parts | (silica 15 parts) | PTMS | 2.5 parts | | | HALS-1 | 0.7 part |
| | IBA | 10 parts | | | | | | | |
| 10 | C6DA | 20 parts | S-1 50 parts | VPTMS | 2.8 parts | APO | 2.0 parts | UA-1 | 4.2 parts |
| | TAS | 20 parts | (silica 15 parts) | PTMS | 2.5 parts | | | HALS-1 | 0.7 part |
| | CHA | 10 parts | | | | | | | |
| 11 | C6DA | 20 parts | S-1 50 parts | VPTMS | 2.8 parts | APO | 2.0 parts | UA-1 | 4.2 parts |
| | TAS | 20 parts | (silica 15 parts) | PTMS | 2.5 parts | | | HALS-1 | 0.7 part |
| | ADA | 10 parts | | | | | | | |
| 12 | C6DA | 20 parts | S-1 50 parts | VPTMS | 2.8 parts | APO | 2.0 parts | UA-1 | 4.2 parts |
| | TAS | 20 parts | (silica 15 parts) | PTMS | 2.5 parts | | | HALS-1 | 0.7 part |
| | DMADA | 10 parts | | | | | | | |
| 13 | C6DA | 20 parts | S-1 50 parts | VPTMS | 2.8 parts | APO | 2.0 parts | UA-1 | 4.2 parts |
| | TAS | 20 parts | (silica 15 parts) | PTMS | 2.5 parts | | | HALS-1 | 0.7 part |
| | TBA | 10 parts | | | | | | | |
| 14 | C6DA | 20 parts | S-1 50 parts | VPTMS | 2.8 parts | APO | 2.0 parts | UA-1 | 4.2 parts |
| | TAS | 20 parts | (silica 15 parts) | PTMS | 2.5 parts | | | HALS-1 | 0.7 part |
| | CPTAA | 10 parts | | | | | | | |
| 15 | C6DA | 20 parts | S-1 50 parts | VPTMS | 2.8 parts | APO | 2.0 parts | UA-1 | 4.2 parts |
| | TAS | 20 parts | (silica 15 parts) | PTMS | 2.5 parts | | | HALS-1 | 0.7 part |
| | CPTEA | 10 parts | | | | | | | |
| 16 | C6DA | 30 parts | S-1 35 parts | MPTMS | 3.0 parts | APO | 1.8 parts | UA-1 | 3.8 parts |
| | TAS | 20 parts | (silica 10.5 parts) | MTMS | 1.7 parts | | | HALS-1 | 0.6 part |
| 17 | C6DA | 30 parts | S-1 35 parts | MPTMS | 3.1 parts | APO | 1.8 parts | UA-1 | 3.8 parts |
| | FA731A | 20 parts | (silica 10.5 parts) | DMDMS | 1.5 parts | | | HALS-1 | 0.6 part |
| 18 | C6DA | 30 parts | S-1 35 parts | MPTMS | 2.2 parts | APO | 1.8 parts | UA-1 | 3.8 parts |
| | FA731A | 20 parts | (silica 10.5 parts) | TMMS | 0.9 part | | | HALS-1 | 0.6 part |
| 19 | C6DA | 30 parts | S-1 35 parts | MPTMS | 2.2 parts | APO | 1.8 parts | UA-1 | 3.8 parts |
| | FA731A | 20 parts | (silica 10.5 parts) | TMS | 1.3 parts | | | HALS-1 | 0.6 part |
| 20 | C6DA | 35 parts | S-2 50 parts | MPTMS | 2.2 parts | APO | 1.8 parts | UA-1 | 3.8 parts |
| | THFA | 15 parts | (silica 10 parts) | PTMS | 1.7 parts | | | HALS-1 | 0.6 part |
| 21 | C6DA | 30 parts | S-1 35 parts | VTMS | 1.3 parts | APO | 1.8 parts | UA-1 | 3.8 parts |
| | TAS | 20 parts | (silica 10.5 parts) | PTMS | 1.7 parts | | | HALS-1 | 0.6 part |
| 22 | C6DA | 30 parts | S-1 35 parts | PATMS | 2.2 parts | APO | 1.8 parts | UA-1 | 3.8 parts |
| | TAS | 20 parts | (silica 10.5 parts) | PTMS | 1.7 parts | | | HALS-3 | 0.6 part |
| 23 | C6DA | 30 parts | S-1 35 parts | PTMS | 1.7 parts | APO | 1.8 parts | UA-1 | 3.8 parts |
| | TAS | 20 parts | (silica 10.5 parts) | APTMS | 1.7 parts | | | | |
| 24 | C6DA | 30 parts | S-1 35 parts | PTMS | 1.7 parts | APO | 1.8 parts | UA-1 | 3.8 parts |

TABLE 1-continued

|  |  | Polyfunctional acrylate |  | Colloidal silica dispersion |  | Silane compound |  | Polymerization initiator |  | Ultraviolet absorber & light stabilizer |  |
|---|---|---|---|---|---|---|---|---|---|---|---|
|  |  | TAS | 20 parts | (silica | 10.5 parts) | APTMS | 1.7 parts |  |  | HALS-3 | 0.6 part |
|  | 25 | C6DA | 30 parts | S-1 | 35 parts | PTMS | 1.7 parts | APO | 1.8 parts | UA-1 | 3.8 parts |
|  |  | TAS | 20 parts | (silica | 10.5 parts) | APTMS | 1.7 parts |  |  | HALS-4 | 0.6 part |
|  | 26 | C6DA | 30 parts | S-1 | 35 parts | PTMS | 1.7 parts | APO | 1.8 parts | UA-1 | 3.8 parts |
|  |  | TAS | 20 parts | (silica | 10.5 parts) | VPTMS | 1.0 part |  |  | HALS-3 | 0.6 part |
|  |  |  |  |  |  | APTMS | 0.8 part |  |  |  |  |
|  | 27 | C6DA | 20 parts | S-1 | 100 parts | MPTMS | 6.2 parts | APO | 1.2 parts | UA-1 | 10.0 parts |
|  |  | M-215 | 80 parts | (silica | 30 parts) | PTMS | 10.0 parts | MPG | 0.8 part | HALS-3 | 0.4 part |
| Comparative | | C6DA | 30 parts | — | | — | | APO | 1.8 parts | UA-1 | 3.0 parts |
| Example | 1 | TAS | 20 parts |  |  |  |  |  |  | HALS-3 | 0.5 part |
|  | 2 | C6DA | 30 parts | S-1 | 35 parts | — | | APO | 1.8 parts | UA-1 | 3.8 parts |
|  |  | TAS | 20 parts | (silica | 10.5 parts) |  |  |  |  |  |  |
|  | 3 | C6DA | 30 parts | S-1 | 35 parts | VPTMS | 3.9 parts | APO | 1.8 parts | UA-1 | 3.8 parts |
|  |  | TAS | 20 parts | (silica | 10.5 parts) |  |  |  |  |  |  |
|  | 4 | C6DA | 30 parts | S-1 | 35 parts | MPTMS | 4.2 parts | APO | 1.8 parts | UA-1 | 3.8 parts |
|  |  | TAS | 20 parts | (silica | 10.5 parts) |  |  |  |  |  |  |
|  | 5 | C6DA | 30 parts | S-1 | 35 parts | MPTMS | 4.2 parts | APO | 1.8 parts | UA-1 | 3.8 parts |
|  |  | TAS | 20 parts | (silica | 10.5 parts) |  |  |  |  | HALS-1 | 0.6 part |
|  | 6 | C6DA | 40 parts | S-1 | 35 parts | MPTMS | 4.2 parts | APO | 1.8 parts | UA-1 | 3.8 parts |
|  |  | IBA | 10 parts | (silica | 10.5 parts) |  |  |  |  |  |  |
|  | 7 | C6DA | 30 parts | S-1 | 35 parts | APTMS | 3.4 parts | APO | 1.8 parts | UA-1 | 3.8 parts |
|  |  | TAS | 20 parts | (silica | 10.5 parts) |  |  |  |  |  |  |

(Abbreviations in Table 1)
C6DA: 1,6-Hexanediol diacrylate
TAS: A condensate of trimethylolethane/acrylic acid/succinic acid (in a molar ratio of 2/4/1)
C9DA: 1,9-Nonanediol diacrylate
FA731A: Tris(acryloyloxyethyl) isocyanurate (manufactured and sold by Hitachi Chemical Co., Ltd. under the trade name of FA-731A)
DPHA: Dipentaerythritol hexaacrylate
R-684: Dicylcopentanyl diacrylate (manufactured and sold by Nippon Kayaku Co., Ltd. under the trade name of Kayarad R-684)
IBA: Isobornyl acrylate
CHA: Cyclohexyl acrylate
ADA: 1-Adamantyl acrylate
DMADA: 3,5-Dimethyl-1-adamantyl acrylate
TBA: t-Butyl acrylate
CPTAA: Cyclopentanyl acrylate
CPTEA: Cyclopentenyl acrylate
THFA: Tetrahydrofurfuryl acrylate
M-215: Bis(acryloyloxyethyl) hydroxyethyl isocyanurate (manufactured and sold by Toagosei Chemical Industry Co., Ltd. under the trade name of Aronix M-215)
S-1: A dispersion of colloidal silica in isopropyl alcohol (with a silica content of 30% by weight; manufactured and sold by Nissan Chemical Industries Ltd. under the trade name of IPA-ST)
S-2: A dispersion of colloidal silica in water (with a silica content of 20% by weight; manufactured and sold by Nissan Chemical Industries Ltd. under the trade name of Snowtex O)
VPTMS: p-Vinylphenyltrimethoxysilane
PTMS: Phenyltrimethoxysilane
MPTMS: γ-Aminopropyltrimethoxysilane
APO: 2,4,6-Trimethylbenzoyldiphenylphosphine oxide (manufactured and sold by BASF AG under the trade name of LUCIRIN-TPO)
BAPO: A mixture of bis(2,6-dimethoxybenzoyl)-2,4,4-trimethylpentylphosphine oxide/2-hydroxy-2-methyl-1-phenylpropan-1-one in a weight ratio of 1/3 (manufactured and sold by Ciba-Geigy Ltd. under the trade name of CGI-1700)
MPG: Methyl phenyl glyoxylate (manufactured and sold by Akzo Japan Ltd. under the trade name of VICURE-55)
UA-1: 2-(2'-Hydroxy-5'-tert-butylphenyl)benzotriazole (manufactured by Ciba-Geigy Ltd. under the trade name of Tinuvin-PS)
UA-2: 2-(2'-Hydroxy-5'-tert-octylphenyl)benzotriazole (manufactured by Ciba-Geigy Ltd. under the trade name of Tinuvin-329)
HALS-1: Bis(1-octoxy-2,2,6,6-tetramethyl-4-piperidyl) sebacate (manufactured and sold by Ciba-Geigy Ltd. under the trade name of Tinuvin-123)
HALS-2: 4-Benzoyloxy-2,2,6,6-tetramethylpiperidine (manufactured and sold by Sankyo Co., Ltd. under the trade name of Sanol LS-744)
HALS-3: Bis(2,2,6,6-tetramethyl-4-piperidyl) sebacate (manufactured and sold by Sankyo Co., Ltd. under the trade name of Sanol LS-770)
HALS-4: Bis(1,2,2,6,6-pentamethyl-4-piperidyl) sebacate (manufactued and sold by Sankyo Co., Ltd. under the trade name of Sanol LS-765)

TABLE 2

|  |  | Mar resistance to steel wool | Taber abrasion resistance |  |  | Weather resistance | |
|---|---|---|---|---|---|---|---|
|  | Substrate | (%) | (%) | Appearance | Adhesion | 1,000 hr | 2,000 hr |
| Example 1 | PC | 0.3 | 2.6 | ◯ | 100/100 | ◯ | ◯ |
| 2 | PC | 0.3 | 2.5 | ◯ | 100/100 | ◯ | ◯ |
| 3 | PC | 0.1 | 2.5 | ◯ | 100/100 | ◯ | ◯ |
| 4 | PC | 0.1 | 2.4 | ◯ | 100/100 | ◯ | ◯ |

TABLE 2-continued

|  | Substrate | Mar resistance to steel wool (%) | Taber abrasion resistance (%) | Appearance | Adhesion | Weather resistance 1,000 hr | Weather resistance 2,000 hr |
|---|---|---|---|---|---|---|---|
| 5 | PC | 0.2 | 2.4 | O | 100/100 | O | O |
| 6 | PC | 0.3 | 2.6 | O | 100/100 | O | O |
| 7 | PC | 0.1 | 2.4 | O | 100/100 | O | O |
| 8 | PC | 0.3 | 2.7 | O | 100/100 | O | O |
| 9 | PC | 0.5 | 3.0 | O | 100/100 | O | O |
| 10 | PC | 0.7 | 3.4 | O | 100/100 | O | O |
| 11 | PC | 0.5 | 3.0 | O | 100/100 | O | O |
| 12 | PC | 0.5 | 3.2 | O | 100/100 | O | O |
| 13 | PC | 0.8 | 3.5 | O | 100/100 | O | O |
| 14 | PC | 0.5 | 3.0 | O | 100/100 | O | O |
| 15 | PC | 0.5 | 3.1 | O | 100/100 | O | O |
| 16 | PC | 0.3 | 2.5 | O | 100/100 | O | O |
| 17 | PC | 0.3 | 2.7 | O | 100/100 | O | O |
| 18 | PC | 0.3 | 2.8 | O | 100/100 | O | O |
| 19 | PC | 0.2 | 2.5 | O | 100/100 | O | O |
| 20 | PMMA | 0.4 | 3.0 | O | 100/100 | O | O |
| 21 | PC | 0.5 | 3.0 | O | 100/100 | O | O |
| 22 | PC | 0.5 | 2.8 | O | 100/100 | O | O |
| 23 | PC | 0.1 | 2.5 | O | 100/100 | O | O |
| 24 | PC | 0.3 | 2.4 | O | 100/100 | O | O |
| 25 | PC | 0.3 | 2.5 | O | 100/100 | O | O |
| 26 | PC | 0.1 | 2.4 | O | 100/100 | O | O |
| 27 | PC | 0.6 | 3.0 | O | 100/100 | O | O |
| Comparative Example 1 | PC | 1.0 | 8.9 | O | 100/100 | O | O |
| 2 | The coating composition underwent gelation during preparation and could not be applied. | | | | | | |
| 3 | PC | 0.3 | 2.5 | O | 100/100 | O | X |
| 4 | PC | 0.3 | 2.6 | O | 100/100 | O, Δ | X, Δ |
| 5 | PC | 0.4 | 3.0 | O | 100/100 | O | X, Δ |
| 6 | PC | 0.9 | 6.0 | O | 100/100 | O | X, Δ |
| 7 | The coating composition underwent gelation during preparation and could not be applied. | | | | | | |

(Abbreviations in Table 2)
PC: Polycarbonate
PMMA: Polymethyl methacrylate

The coating composition of the present invention are coating compositions which can be applied either in solventless form or in solution form. When they are applied to substrates and then cured, the resulting cured film has excellent abrasion resistance and impact resistance and presents a good appearance. Moreover, the cured film exhibits excellent weather resistance and is effective in preventing the occurrence of cracks and other defects in the film.

Furthermore, the surface-coated molded articles of the present invention have a surface coated with a cured film having the above-described effects. Thus, the present invention makes it possible to provide synthetic resin molded articles which can solve various problems recognized in the prior art, such as a reduction in aesthetic value due to surface damage.

We claim:

1. A coating composition comprising a mixture of (a) a crosslinking polymerizable compound (a-1) having at least two functional groups selected from the group consisting of acryloyloxy and methacryloyloxy groups in the molecule, or a mixture composed of 50% by weight or more of the crosslinking polymerizable compound (a-1) and 50% by weight or less of a compound (a-2) copolymerizable therewith, (b) finely divided silica having its surface modified by a hydrolyzate of a mixture composed of 5 of 95 molar parts of at least one silane compound (b-1) selected from among silane compounds of the general formulas (I) to (IV)

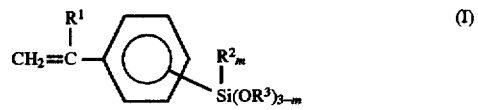

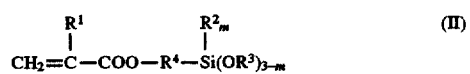

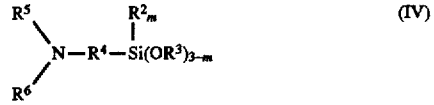

where $R^1$ is a hydrogen atom or a methyl group, $R^2$ is a hydrocarbon radical of 1 to 10 carbon atoms, $R^3$ is a hydrogen atom or a hydrocarbon radical of 1 to 10 carbon atoms, $R^4$ is a divalent hydrocarbon radical of 1 to 10 carbon atoms, $R^5$ and $R^6$ which may be the same or different are each a hydrogen atom or a hydrocarbon radical of 1 to 10 carbon atoms, and m is an integer of 0 to 2, and 95 to 5 molar parts of a silane compound (b-2) of the general formula (V)

where $R^7$ and $R^8$ which may be the same or different are each a hydrocarbon radical of 1 to 10 carbon atoms, $R^9$ is a hydrogen atom or a hydrocarbon radical of 1 to 10 carbon atoms, n and p are each an integer of 0 to 3, and (n+p) has a value of 0 to 3, and (c) a high-energy radiation polymerization initiator, wherein component (b) is present in an amount of 5 to 60 parts by weight per 100 parts by weight of compound (a), and component (c) is present in an amount of 0.01 to 10 parts by weight per 100 parts by weight of component (a).

2. A coating composition as claimed in claim 1 wherein the molar ratio of the silane compound (b-1) to the silane compound (b-2) is in the range of 10:90 to 90:10.

3. A coating composition as claimed in claim 1 wherein the molar ratio of the silane compound (b-1) to the silane compound (b-2) is in the range of 10:90 to 60:40.

4. A coating composition as claimed in claim 1 wherein the finely divided silica used for the preparation of component (b) is colloidal silica.

5. A coating composition as claimed in claim 1 wherein component (a) is a mixture composed of 70% by weight or more of the compound (a-1) and 30% by weight or less of the compound (a-2).

6. A coating composition as claimed in claim 5 wherein the compound (a-2) is a polymerizable compound having one acryloyloxy or methacryloyloxy group in the molecule.

7. A coating composition as claimed in claim 5 wherein the compound (a-2) is at least one compound selected from the group consisting of isobornyl acrylate, cyclohexyl acrylate, 1-adamantyl acrylate, 3,5-dimethyl-1-adamantyl acrylate, t-butyl acrylate, dicyclopentanyl acrylate, dicyclopentenyl acrylate, isobornyl methacrylate, cyclohexyl methacrylate, 1-adamantyl methacrylate, 3,5-dimethyl-1-adamantyl methacrylate, t-butyl methacrylate, dicyclopentanyl methacrylate and dicyclopentenyl methacrylate.

8. A coating composition as claimed in claim 1 wherein component (c) is at least one compound selected from the group consisting of 2,4,6-trimethylbenzoyldiphenylphosphine oxide, bis(2,6-dimethoxybenzoyl)-2,4,4-trimethylpentylphosphine oxide and methyl phenyl glyoxylate.

9. A coating composition as claimed in claim 1 which further contains at least one of an ultraviolet absorber (d) and a light stabilizer (e).

10. A coating composition as claimed in claim 9 wherein component (d) is an ultraviolet absorber derived from benzotriazole.

11. A coating composition as claimed in claim 9 wherein component (e) is a hindered amine type light stabilizer.

12. A coating composition as claimed in claim 11 wherein component (e) is at least one compound selected from the group consisting of bis(2,2,6,6-tetramethyl-4-piperidyl) sebacate, bis(1,2,2,6,6-pentamethyl-4-piperidyl) sebacate, 4-benzoyloxy-2,2,6,6-tetramethylpiperidine and bis(1-octoxy-2,2,6,6-tetramethyl-4-piperidyl) sebacate.

13. A molded article having a surface coated with the cured product of a coating composition as claimed in claim 1.

14. A surface-coated molded article as claimed in claim 13 wherein the molded article having a surface coated with the coating composition is a headlamp cover.

15. A surface-coated molded article as claimed in claim 13 wherein the molded article having a surface coated with the coating composition is a windshield, windowpane or roofing panel for transport means.

16. A surface-coated molded article as claimed in claim 13 wherein the molded article having a surface coated with the coating composition is a windowpane or roofing material for buildings.

17. A surface-coated molded article as claimed in claim 13 wherein the molded article having a surface coated with the coating composition is a soundproof barrier for roads.

18. A surface-coated molded article as claimed in claim 13 wherein the molded article having a surface coated with the coating composition is a nameplate or a face plate for display use.

19. A method for preparing a coating composition as claimed in claim 1 by mixing components (a), (b) and (c), which comprises the steps of adding the silane compound (b-2) to a dispersion of finely divided silica so as to modify the surfaces of the finely divided silica by a hydrolyzate of the silane compound (b-2), then adding component (a) and distilling off the dispersion medium for finely divided silica and water, and thereafter adding the silane compound (b-1) so as to further modify the surfaces of the finely divided silica by a hydrolyzate of the silane compound (b-1).

20. A method as claimed in claim 19 wherein the silane compound (b-1) is a silane compound of the general formula (IV).

* * * * *